United States Patent
Eromaki

(10) Patent No.: US 10,288,889 B2
(45) Date of Patent: May 14, 2019

(54) SMART EYEWEAR WITH MOVABLE DISPLAY

(71) Applicant: Microsoft Technology Licensing, LLC, Redmond, WA (US)

(72) Inventor: Marko Eromaki, Tampere (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 154 days.

(21) Appl. No.: 15/196,629

(22) Filed: Jun. 29, 2016

(65) Prior Publication Data

US 2018/0003985 A1 Jan. 4, 2018

(51) Int. Cl.
*G02B 27/14* (2006.01)
*G02B 27/01* (2006.01)

(52) U.S. Cl.
CPC .. *G02B 27/0176* (2013.01); *G02B 2027/0159* (2013.01); *G02B 2027/0163* (2013.01); *G02B 2027/0178* (2013.01)

(58) Field of Classification Search
CPC ................................................ G02B 27/0101
USPC ................................................. 359/630–633
See application file for complete search history.

(56) References Cited

U.S. PATENT DOCUMENTS

| | | |
|---|---|---|
| 5,455,638 A | 10/1995 | Kallman et al. |
| 5,768,716 A | 6/1998 | Porsche |
| 7,607,775 B2 | 10/2009 | Hermanson et al. |
| 8,217,856 B1 | 7/2012 | Petrou |
| 8,643,568 B2 * | 2/2014 | West ................ G02B 27/0176 345/7 |
| 8,992,008 B2 | 3/2015 | Rubin |
| 9,134,534 B2 | 9/2015 | Border et al. |
| 2006/0119539 A1 * | 6/2006 | Kato ................. G02B 27/0176 345/8 |
| 2009/0073082 A1 * | 3/2009 | Yoshikawa ........ G02B 27/0172 345/8 |
| 2010/0110368 A1 | 5/2010 | Chaum |
| 2013/0300637 A1 | 11/2013 | Smits et al. |
| 2013/0329183 A1 | 12/2013 | Blum et al. |
| 2014/0063054 A1 | 3/2014 | Osterhout et al. |
| 2014/0192310 A1 | 7/2014 | Kim et al. |
| 2015/0022773 A1 | 1/2015 | Kim et al. |

FOREIGN PATENT DOCUMENTS

CN 104007606 A 8/2014

OTHER PUBLICATIONS

Fei, et al., "Origami Theory and its Applications: A Literature Review", In International Journal of Social, Business, Psychological, Human Science and Engineering, vol. 7, Issue 1, Jan. 21, 2013, pp. 1131-1135.

* cited by examiner

*Primary Examiner* — James C. Jones
(74) *Attorney, Agent, or Firm* — Alleman Hall Creasman & Tuttle LLP

(57) ABSTRACT

One example provides a near-eye display system comprising a frame configured to be supported by a head of a user, and a movable near-eye display comprising a display optic support coupled with the frame via a first arm and a second arm. Each of the first arm and the second arm is pivotally coupled to the frame and to the display optic support such that the display optic support is movable with respect to the frame. The system further includes a display optic coupled to the display optic support.

20 Claims, 10 Drawing Sheets

SMART EYEWEAR WITH MOVABLE DISPLAY

BACKGROUND

Smart eyewear incorporates computing and display functionalities into devices that are wearable like glasses. Some smart eyewear may have transparent display optics to allow content to be displayed over a view of the real world, while others may have opaque display optics that occlude the background view. In either case, the display optics may be held in a fixed location in front of a user's eye.

SUMMARY

Examples are disclosed that relate to smart eyewear having display optics movable between a viewing position and a retracted position. One example provides a near-eye display system comprising a frame configured to be supported by a head of a user, and a movable near-eye display comprising a display optic support coupled with the frame via a first arm and a second arm. Each of the first arm and the second arm is pivotally coupled to the frame and to the display optic support such that the display optic support is movable with respect to the frame. The system further includes a display optic coupled to the display optic support.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, smart eyewear, also referred to herein as near-eye display systems, may have a rigid frame that holds display optics in a fixed location in front of a user's eye, such that the frame and/or the display optic are continually present in the user's field of view. However, a user may desire to view displayed content at limited times, rather than continuously. When content is not being viewed, the display optic may partially obstruct the user's view, which may impact the device use experience.

Figure 1:
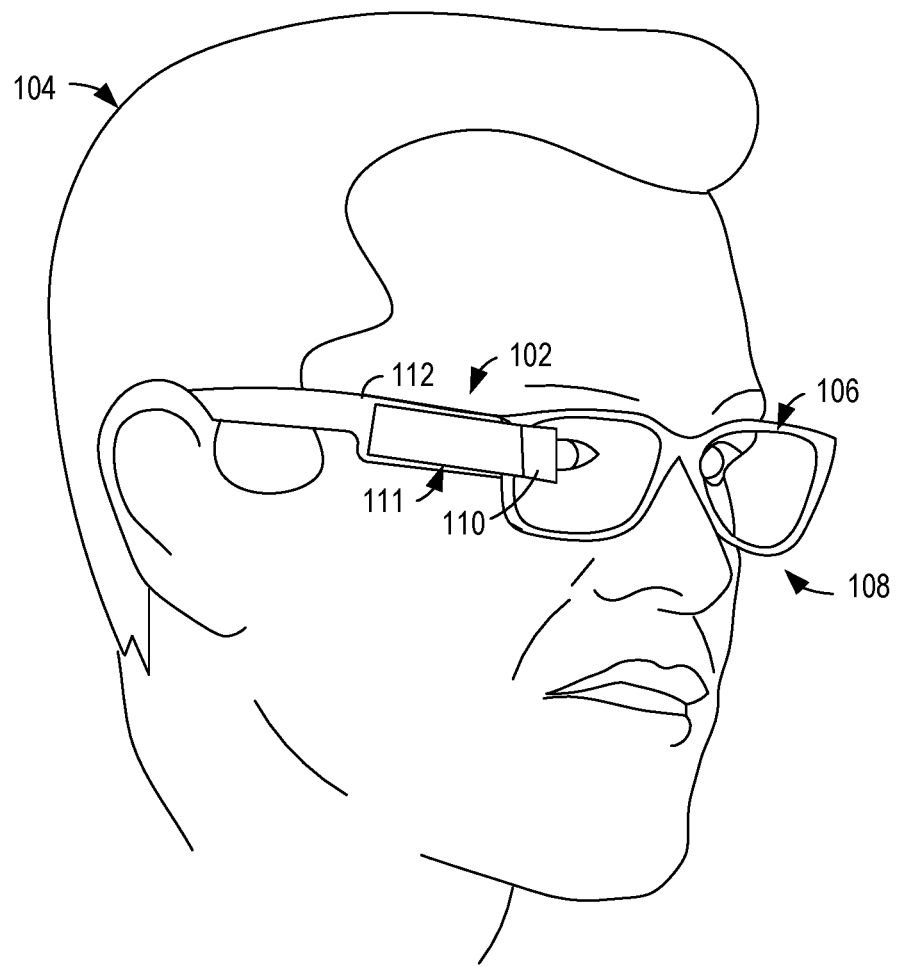
FIG. 1 shows an example near-eye display system as worn by a user.

Accordingly, example are disclosed of near-eye display systems that comprise display optics movable between a viewing position in which a user may view a displayed image, and a retracted position in which the display optics are in a less visible location or even entirely out of the user's field of view. FIG. 1 shows an example near-eye display system 102 as worn by a user 104. The near-eye display system 102 comprises a frame 106 supported by a head of the user 104 to position a display optic 110 near the user's eye. As described in more detail below, the display optic 110 may be moved to a location within the user's field of view when in use, and at least partially away from the user's field of view when not in use.

The display optic 110 is included in a display subsystem 111 positioned on a temple arm 112 of the frame 106. In some examples, the display optic 110 may be substantially opaque, such that the user cannot see through the display optic. In other examples, the display optic 110 may be at least partially transparent. In such examples, displayed data may be presented as an overlay to a real-world environment of the user 104. Although illustrated on one side of the frame 106, the near-eye display system 102 may alternatively or additionally comprise another display subsystem positioned on an opposing side of the eyewear (e.g., on a left temple arm of the frame).

Figure 2A:
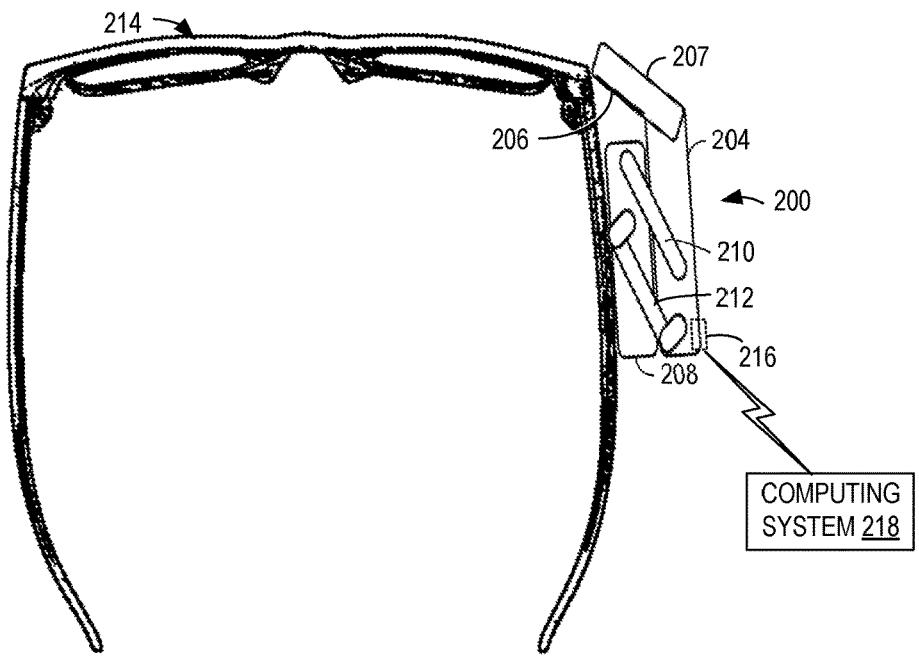
FIGS. 2A-2E show an example movable near-eye display system in various positions.
Figure 7:
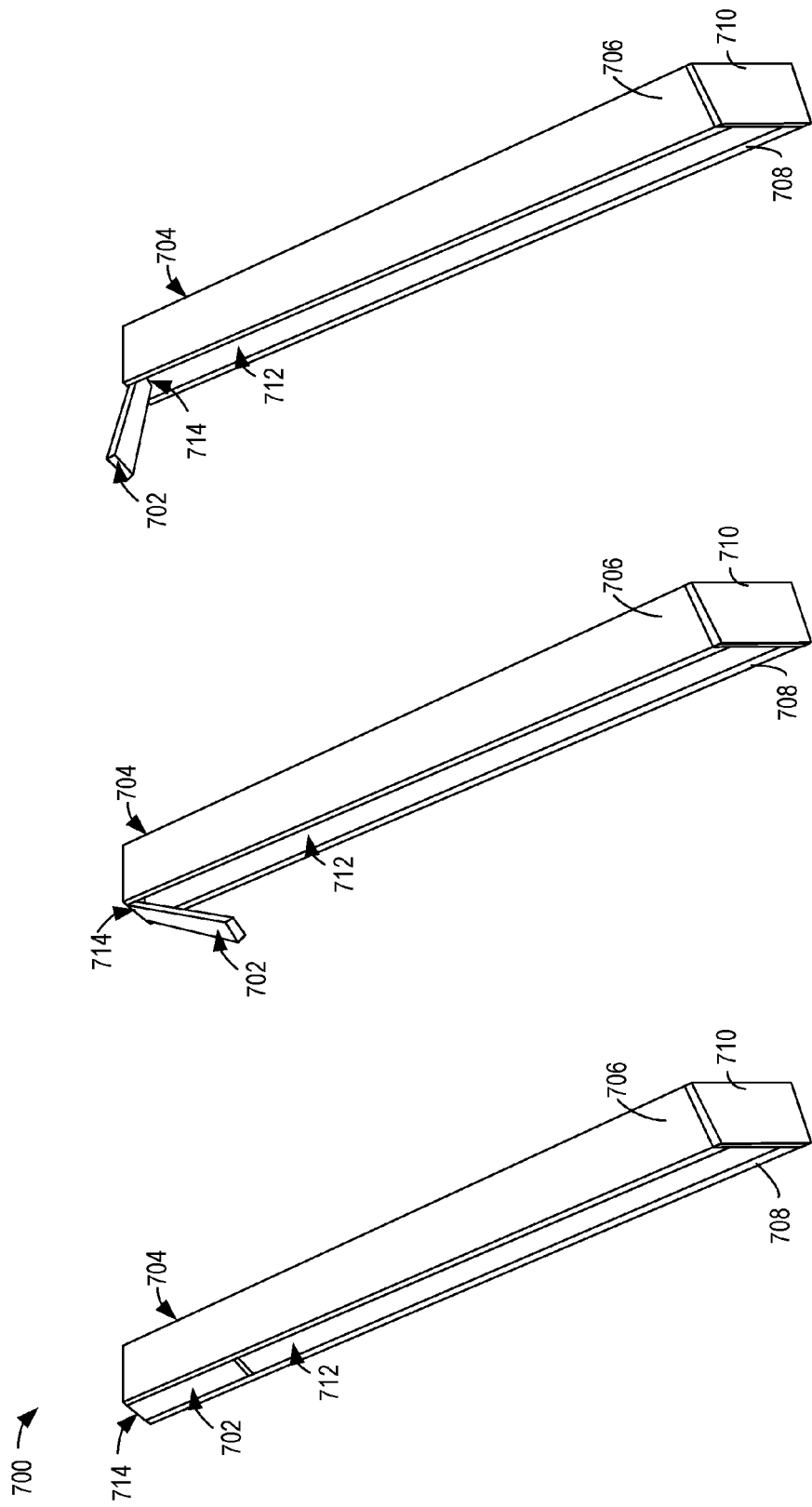
FIGS. 7A-7C show an example movable display optic in various positions.

FIGS. 2A-2E show an example near-eye display system 200 in various positions progressing from a retracted state to an extended state. Near-eye display system 200 is an example of near-eye display system 102 of FIG. 1. First, FIG. 2A shows the near-eye display system 200 in a retracted state. The near-eye display system 200 includes a display optic support 204 and a display optic 206 coupled to the display optic support via a display optic mount 207. In some examples, the display optic 206 and display optic mount 207 may be fixed to the display optic support 204. In other examples, such as described below with reference to FIG. 7, the display optic 206 and/or display optic mount 207 may be pivotally or otherwise movably coupled to allow the display optic to be moved into a retracted position.

The display optic 206 may comprise any suitable structure for displaying an image to a user. In some examples, the display optic 206 includes a display device that outputs an image. In other examples, the display optic 206 includes a reflective, refractive, and/or diffractive element for directing an image produced elsewhere toward a user's eye. Example configurations of the display optic 206 are described in more detail below with respect to FIGS. 4 and 9.

The display optic support 204 is coupled with a base structure 208 via a first arm 210 and a second arm 212. While shown as being positioned on a same side of the base structure/display optic support as one another (e.g., a top side), the first and second arms may be positioned on opposing sides of the base structure/display optic support from one another (e.g., one arm on the top of the base structure/display optic support, and another arm on the bottom of the base structure/display optic support) in other examples. Further, in some examples, more than two arms may be used to couple the base structure to the display optic support.

In FIGS. 2A-2E, the base structure 208 is shown as being separate from but coupled to a frame 214. This coupling may be permanent or releasable. In other examples, the base structure 208 may be integrated with the frame, such that the first and second arms 210 and 212 are pivotally coupled directly to the frame.

The first and second arms 210 and 212 may be pivotally coupled to base structure 208 via any suitable mechanism that allows each arm to rotate or pivot around an axis connecting the arm and the base structure. The pivoting of the first and second arms 210 and 212 causes the display optic support 204 to move forward relative to the frame 214 along an arc-shaped path. In this example, the base structure 208, display optic support 204, and first and second arms 210 and 212 may form sides of a parallelogram-like structure in at least some positions.

The movement of the display optic support 204 and/or the display optic mount 207 may be controlled by an optional deployment control mechanism 216. In various examples, a deployment control mechanism 216 may comprise a simple mechanical mechanism, such as a biasing element (e.g. a spring) and releasable latch. In such an example, the display optic 206 may be deployed by simply releasing the latch, thereby allowing the biasing element to move the display optic support 204 and/or the display optic mount 207 from the retraced position to the viewing position. In some examples, the biasing element may be a single-directional biasing element that maintains the display optic support and/or display optic mount in a single position unless released via the latch. Upon release, the display optic support 204 and/or display optic mount 207 may be manually repositioned to the retracted state.

In other examples, the biasing element may be a bi-directional biasing element that maintains the display optic support 204 and/or display optic mount 207 in one of two or more positions based on a position of the display optic support/mount. For example, a bi-directional biasing element may bias the display optic support 204 and/or display optic mount 207 to a retracted state position until the display optic support/mount is moved a threshold amount away from the retracted state/toward an extended/viewing state (e.g., toward a front of the frame 214 to a switching point). Once the display optic support 204 and/or display optic mount 207 is moved the threshold amount away from the retracted state (e.g., to the switching point), the bi-directional biasing element may switch to bias the display optic support and/or display optic mount to an extended/viewing state position.

In other examples, the optional deployment control mechanism 216 may be electronically controlled. In such an example, the deployment control mechanism may include a motor to move the display optic support 204 and/or the display optic mount 207 between the viewing and retracted positions. Movement may be controlled via a user input device (e.g. a button, touch pad, microphone for voice inputs, camera for gesture inputs, etc.), and/or programmatically (e.g. upon receipt of content for display, such as an email message, text message, or other suitable content). The user input and/or programmatic control may be processed by a computing system 218 on device 200. The computing system 218 may send control instructions (e.g., based on the user input and/or programmatic control) to the deployment control mechanism 216 to control movement of the display optic support 204 and/or the display optic mount 207.

Figure 2B:
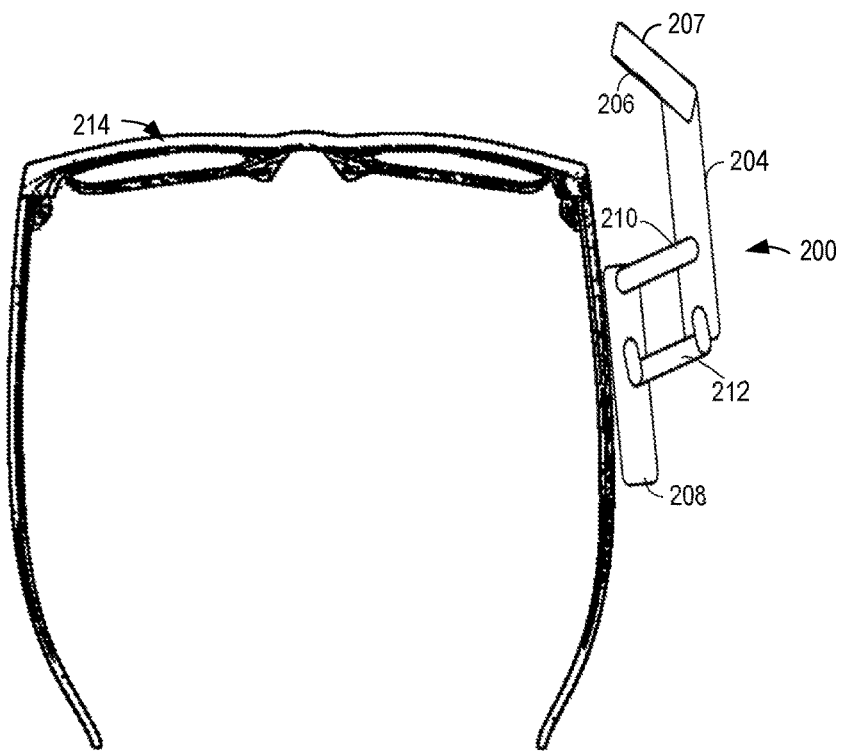
Figure 2C:
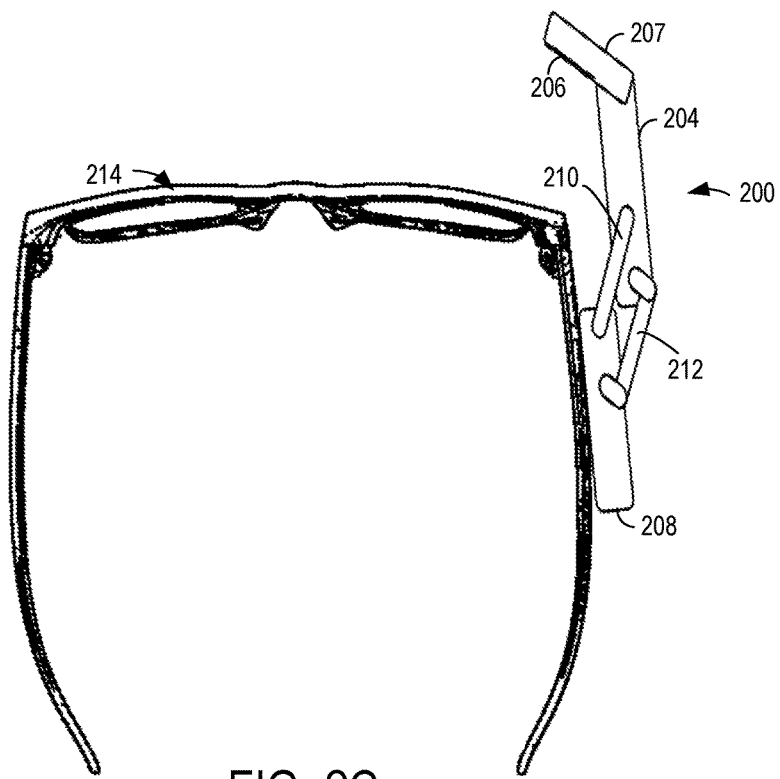

FIGS. 2B and 2C show further progressions in the extension of the near-eye display system 200. In these FIGS., the first and second arms 210 and 212 are pivoted progressively further forward than shown in FIG. 2B, thereby moving the display optic support 204 further forward.

Figure 2D:
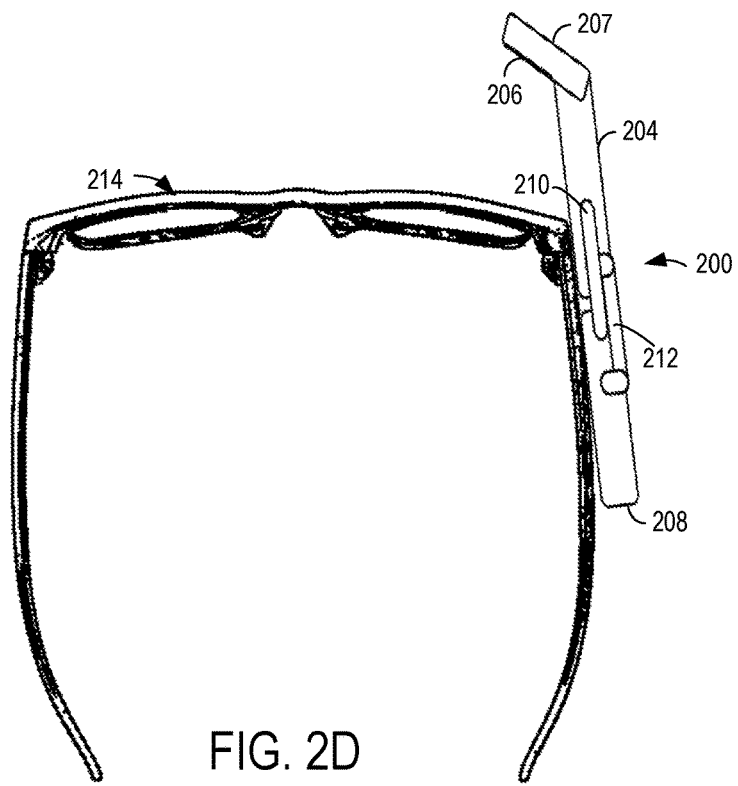
Figure 2E:
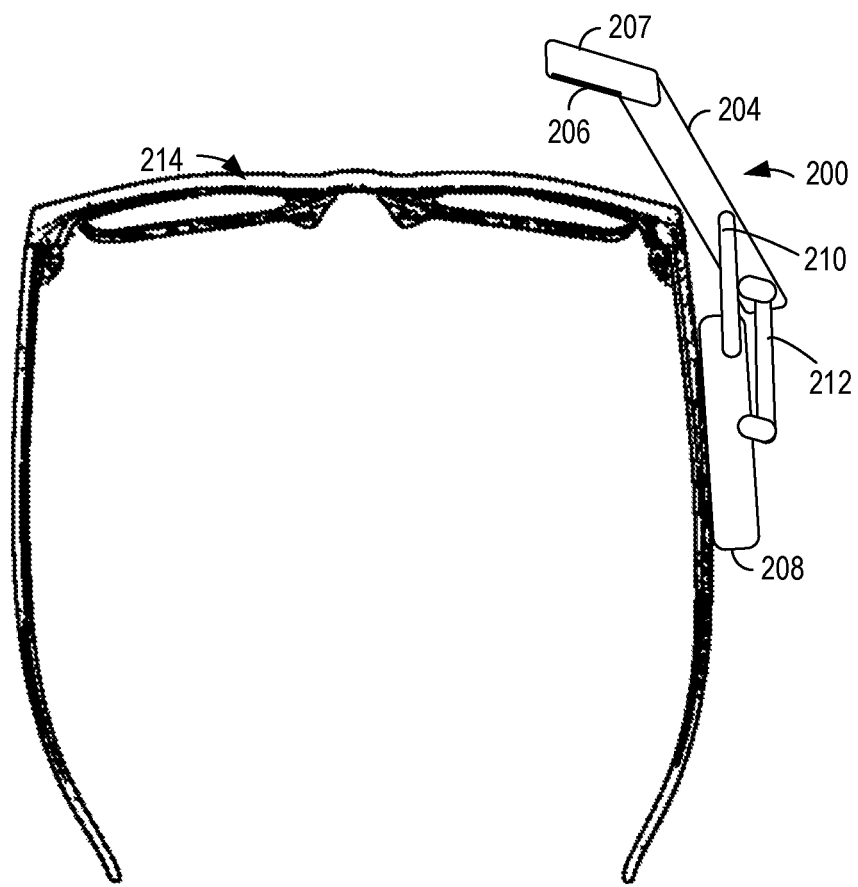

FIG. 2D shows a fully extended state of the display system 200. In this state, the display optic support 204 is moved further forward from the position illustrated in FIG. 2C, such that the display optic 206 is positioned to be viewable by a user. FIG. 2E shows an example of a fine adjustment of the display system 200 to a position that may be comfortably viewed by a user. In this example, the display optic support 204 and/or the display optic 206 are rotated more toward the user's eye relative to the respective position(s) illustrated in FIG. 2D.

Figure 3:
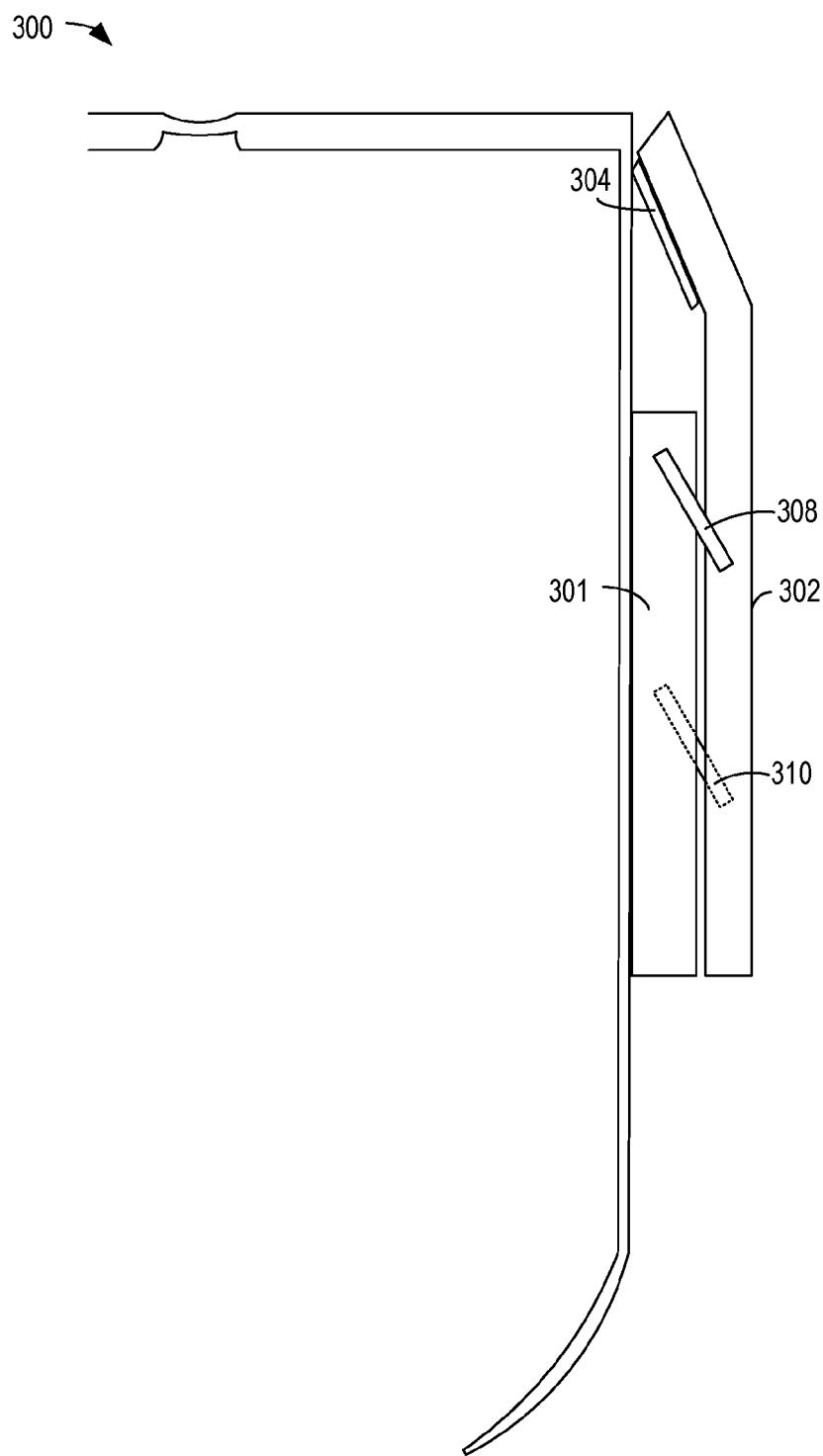
FIG. 3 shows an example arrangement of pivotable arms of a near-eye display system.

In the example of FIGS. 2A-2E, the first and second arms 210 and 212 are positioned on a same side of the base structure 208 and display optic support 204. FIG. 3 shows an example near-eye display system 300 in which arms are located on different sides of these structures. More particularly, near-eye display system 300 includes a base 301, a display optic support 302, and a display optic 304. The base 301 is coupled to the display optic support via a first arm 308 and a second arm 310. The first arm 308 is shown in solid lines to indicate that it is located on a top of the display optic support 302 and the base 301, and the second arm is shown in dashed lines to indicate that it is located on a bottom of these structures. In other examples, the relative positions of the arms relative to the base structure/display optic support may be reversed, such that the first arm 308 is coupled to a bottom of the base structure/display optic support and second arm 310 is coupled to a top of the base structure/display optic support. In still other examples, the arms may both be positioned on an opposite side of the base structure/display optic support from the illustrated side (e.g., the arms may be positioned on a bottom of the base structure/display optic support), or have any other suitable positions.

Figure 9:
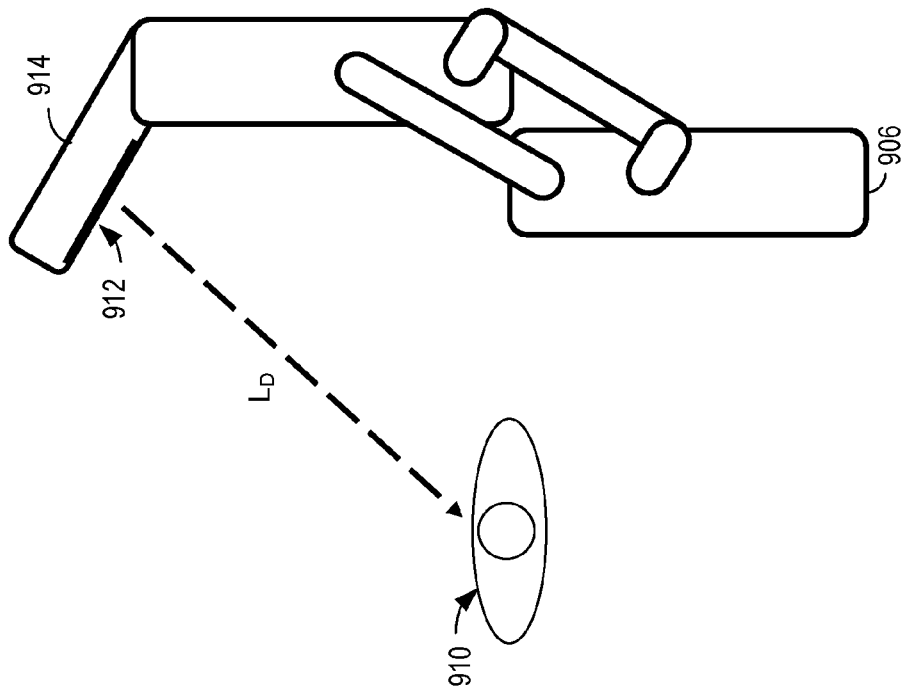
FIG. 9 shows another example display optic configuration.
Figure 4:
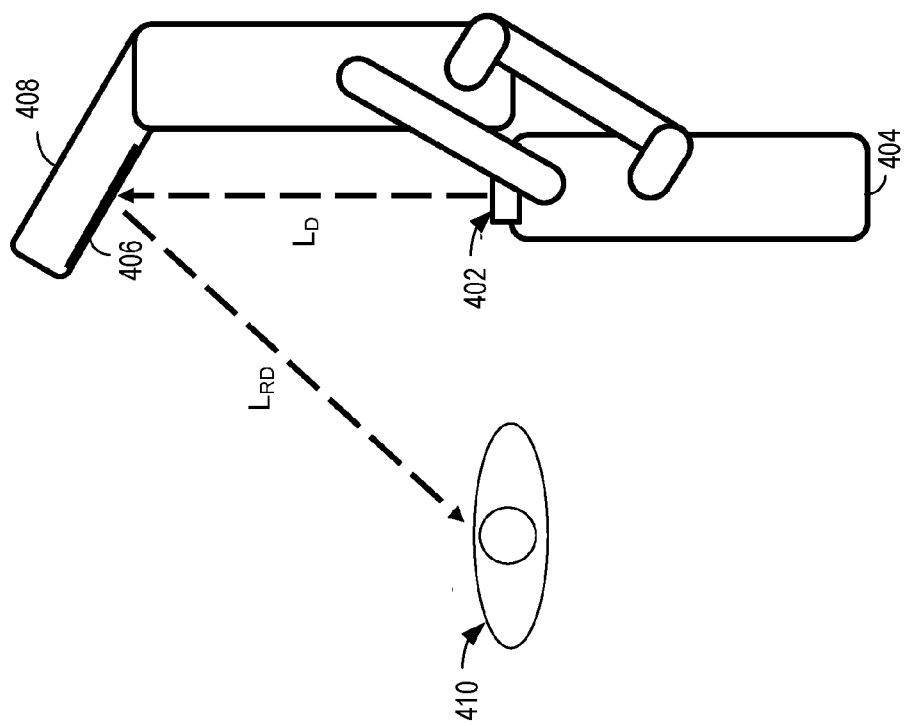
FIG. 4 shows an example display optic configuration.

As mentioned above, the display optic in the examples described herein may take various forms. FIGS. 4 and 9 schematically illustrate two example display optics. First, FIG. 4 shows a display 402 (e.g., a small liquid crystal display (LCD), organic light-emitting device (OLED) display, a microdisplay (e.g. LCD, liquid crystal on silicon (LCOS), digital micromirror device (DLP), or other suitable device) integrated with or coupled to base structure 404. The display 402 is positioned to direct display light $L_D$ toward a display optic 406, which may be mounted on a display optic support mount 408 or at another suitable location. Display optic 406 may include a mirror or other light-redirective element configured to redirect the display light as reflected display light $L_{RD}$ toward an eye 410 of a user. Although a single redirection of light is illustrated in FIG. 4, other example configurations may include multiple light-redirective elements in order to fold the light path to a greater extent than shown in FIG. 4. In yet other examples, other display optics, such as a waveguide configuration, may be used as the display optic 406.

FIG. 9 shows a second example display optic. In this example, the display optic takes the form of a display 912 mounted on a display optic support mount 914 such that display light $L_D$ is directly transmitted to an eye 910 of the user. The display 912 may include any of the display technologies described above with respect to display 402.

Figure 5:
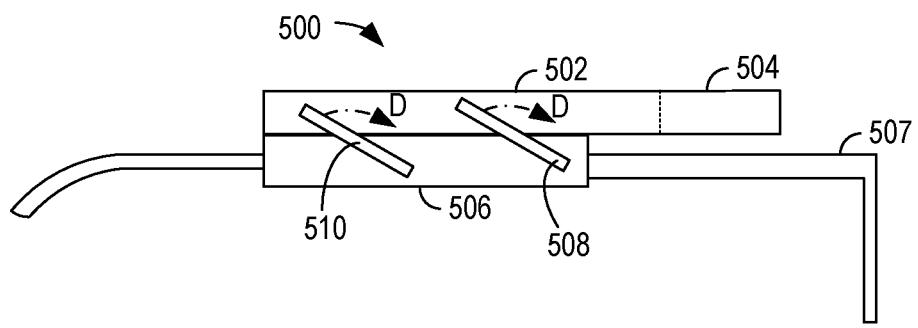
FIG. 5 shows an example support arm arrangement for a near-eye display system.

In the above-described examples, the display optic support moves in an arc that extends outwardly away from a user's temple. FIG. 5 shows an example of a near-eye display system 500 in which a display optic support 502 and display optic 504 are positioned on top of a base structure 506 and move in an arc that extends upwardly relative to the base structure 506 and frame 507, rather than outwardly. In this example, arms 508 and 510 that couple the display optic support 502 to the base structure 506 are positioned on sides of the display optic support and base structure, instead of a top and/or bottom of the components. In such an example, the arms 508 and 510 also may be attached directly to the frame 507.

Figure 6:
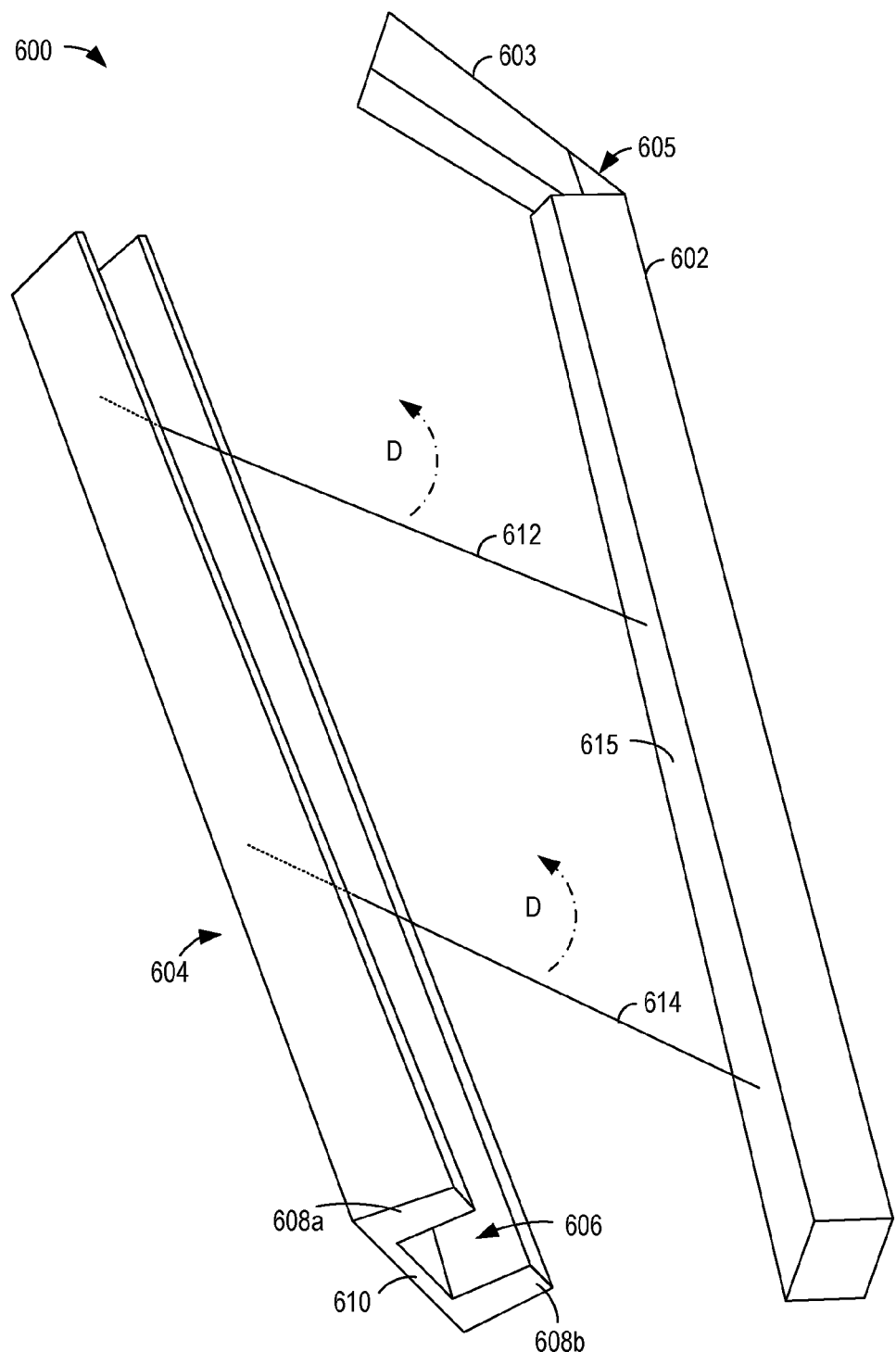
FIG. 6 schematically shows an example nesting arrangement of components of a near-eye display system.

FIG. 6 shows an example in which a near-eye display system 600 includes a display optic support 602 at least partially nested within frame 604 when the display system is in a retracted state. In this figure, the frame 604 and display optic support 602 are shown tilted relative to one another to illustrate the relative geometries of the interfacing surfaces of these structures, and only a portion of the frame is shown. Likewise, the depicted arms 612 and 614 are shown schematically, and are not intended to depict any specific geometric relationship between the arms relative to the display optic support 602 and frame 604.

The display optic support 602 is coupled to a display optic mount 603 via a movable joint 605 (e.g. a hinged joint) that enables movement of the display optic mount 603 relative to the display optic support 602. Frame 604 may take the form of a temple portion of a near-eye display device, or a separate structure that is mounted to a temple portion of a near-eye display device. The portion of the frame 604 may include a receiving region 606 that is sized and shaped to receive the display optic support 602. In the depicted example, frame 604 includes two opposing sides 608a and 608b coupled to one another along one side via a backplane 610. In other examples, the opposing sides may be coupled to each other via one or more end caps, central posts (e.g., extending between the supports in the receiving region), or other structural connectors.

The display optic support 602 may be coupled to the portion of the frame 604 via a first arm 612 and a second arm 614. The first and second arms may be coupled to an interior face of the backplane 610 and an interior face 615 of the display optic support 602, or at any other suitable locations.

FIGS. 7A-7C show an example display optic 702 pivoting between a retracted position and a deployed position relative to a display optic support 704. Display optic support 704 may be an example of any of the above-described display optic supports. Display optic support 704 is depicted as including first and second supports 706 and 708 coupled at least partially via connector 710. Although illustrated as an end cap, the connector 710 may additionally or alternatively positioned in other locations between the supports 706 and in order to couple the supports to one another. Likewise more than one support 706 may be used to connect the first and second supports 706 and 708. In some examples, the display optic support 704 alternatively or additionally may include a backplane coupling the supports in a similar manner to backplane 610 of FIG. 6. The supports and cap may form a receiving region 712 configured to accommodate the display optic 702 while the display optic is retracted within the display optic support 704. As illustrated, the display optic 702 may be pivoted along a hinged joint 714 to reach a deployed state. The display optic 702 may include a light-redirective element or a display. In the deployed state, the display optic 702 may be positioned to redirect or direct display light toward an eye of a user via the light-redirective element or display. The display optic may be controlled via a biasing element, latch, and/or actuator in a similar manner to the examples described above with respect to FIG. 6. In some examples, the display optic may be controlled together with the movable display optic support via a same actuating control, or controlled via a different actuating control in other examples.

Thus, by providing near-eye display systems that can be moved away from a user's eye when not in use, the disclosed examples may allow a user to continue to wear a near-eye display device with less or no vision occlusion by the display when the display is not being viewed. In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
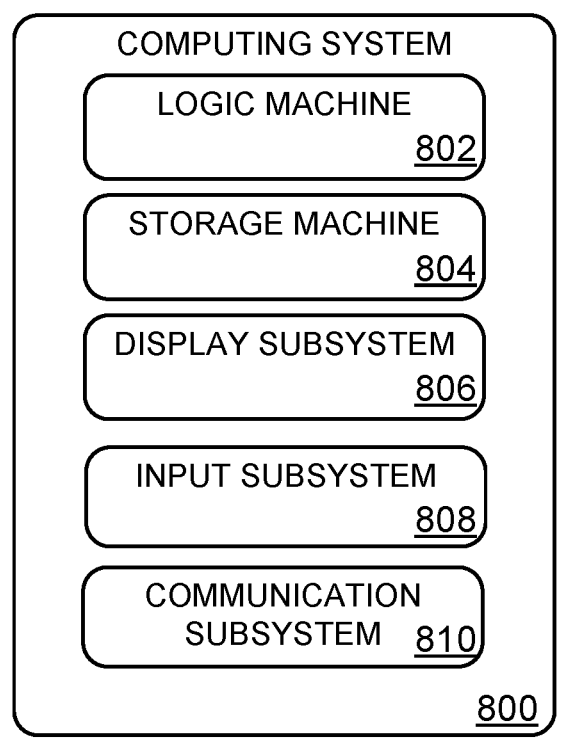
FIG. 8 is a block diagram of an example computing device.

FIG. 8 schematically shows a non-limiting embodiment of a computing system 800 that can enact one or more of the methods and processes described above. Computing system 800 is shown in simplified form. Computing system 800 may take the form of one or more controllers for a near-eye display system, head-mounted display devices, personal computers, server computers, tablet computers, home-entertainment computers, network computing devices, gaming devices, mobile computing devices, mobile communication devices (e.g., smart phone), and/or other computing devices. For example, computing system 800 may be an example of computing system 218 of FIG. 2A, and/or of any of the other near-eye display device examples described herein.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 806 may be used to present a visual representation of data held by storage machine 804. For example, display subsystem 806 may control display light output via the displays described above (e.g., display 402 FIG. 4 and display 912 of FIG. 9). This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. For example, deployment control mechanism 216 of FIG. 2A may be included in and/or coupled to input subsystem 808. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides a near-eye display system including a frame configured to be supported by a head of a user, and a movable near-eye display including a display optic support coupled with the frame via a first arm and a second arm, each of the first arm and the second arm being pivotally coupled to the frame and to the display optic support such that the display optic support is movable with respect to the frame, and a display optic coupled to the display optic support. In such an example, the display optic may additionally or alternatively comprise a display. In such an example, the display optic may additionally or alternatively comprise a redirective element. In such an example, each of the first arm and the second arm may additionally or alternatively be coupled to a same side of the display optic support. In such an example, the near-eye display system may additionally or alternatively further comprise a base structure coupled between the frame and the display optic support, wherein the first arm and the second arm are coupled to each of the base structure and the display optic support. In such an example, the display optic support may additionally or alternatively comprise a first support and a second support, and the display optic may additionally or alternatively be mounted between the first support and the second support. In such an example, the display optic may additionally or alternatively be movable between a viewing position and a retracted position. In such an example, the near-eye display system may additionally or alternatively further comprise an electronically controlled movement mechanism configured to move the movable near-eye display between an extended position and a retracted position. Any or all of the above-described examples may be combined in any suitable manner in various implementations.

Another example provides for a near-eye display system including a frame configured to be supported by a head of a user, and a movable near-eye display including a display optic support coupled with the frame via a first arm and a second arm, each of the first arm and the second arm being pivotally coupled to the frame and to the display optic support such that the display optic support is movable with respect to the frame, and a display optic movably coupled to the display optic support. In such an example the display optic may additionally or alternatively comprise one or more of a display and a redirective element. In such an example, each of the first arm and the second arm may additionally or alternatively be coupled to a same side of the display optic support. In such an example, the first arm and the second arm may additionally or alternatively be coupled to different sides of the display optic support. In such an example, the display optic support may additionally or alternatively comprise a first support and a second support, and the display optic may additionally or alternatively be movably mounted between the first support and the second support. In such an example, the near-eye display system may additionally or alternatively further comprise an electronically controlled movement mechanism configured to move the movable near-eye display between an extended position and a retracted position. Any or all of the above-described examples may be combined in any suitable manner in various implementations.

Another example provides for a near-eye display system including a frame configured to be supported by a head of a user; a movable near-eye display including a display optic support coupled with the frame via a first arm and a second arm, each of the first arm and the second arm being pivotally coupled to the frame and to the display optical mount such that the display optic support is movable with respect to the frame, and a display optic coupled to the display optic support; and an electronically controlled movement mechanism operatively coupled to the retractable near-eye display to move the near-eye display between an extended position and a retracted position. In such an example, the display optic may additionally or alternatively comprise one or more of a display and a redirective element. In such an example each of the first arm and the second arm may additionally or alternatively be coupled to a same side of the display optic support. In such an example, the first arm and the second arm may additionally or alternatively be coupled to different sides of the display optic support. In such an example, the display optic support may additionally or alternatively comprise a first support and a second support, and the display optic may additionally or alternatively be mounted between the first support and the second support. In such an example, the near-eye display system may additionally or alternatively further comprise an electronically controlled movement mechanism configured to move the movable near-eye display between an extended position and a retracted position. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A near-eye display system, comprising:
   a frame configured to be supported by a head of a user; and
   a movable near-eye display comprising
      a display optic support coupled with the frame via a first arm and a second arm, the first arm being pivotally coupled to the frame and to the display optic support at a first pivot, and the second arm being pivotally coupled to the frame and to the display optic support at a second pivot, such that the display optic support is movable with respect to the frame; and
      a display optic coupled to the display optic support.

2. The near-eye display system of claim 1, wherein the display optic comprises a display.

3. The near-eye display system of claim 1, wherein the display optic comprises a redirective element.

4. The near-eye display system of claim 1, wherein the first arm and the second arm are each coupled to a same side of the display optic support.

5. The near-eye display system of claim 1, further comprising a base structure coupled between the frame and the display optic support, wherein the first arm and the second arm are coupled to each of the base structure and the display optic support.

6. The near-eye display system of claim 1, wherein the display optic support comprises a first support and a second support, and wherein the display optic is mounted between the first support and the second support.

7. The near-eye display system of claim 6, wherein the display optic is movable between a viewing position and a retracted position.

8. The near-eye display system of claim 1, further comprising an electronically controlled movement mechanism configured to move the movable near-eye display between an extended position and a retracted position.

9. A near-eye display system, comprising:
   a frame configured to be supported by a head of a user; and
   a movable near-eye display comprising
      a display optic support coupled with the frame via a first arm and a second arm, the first arm being pivotally coupled to the frame and to the display optic support at a first pivot, and the second arm being pivotally coupled to the frame and to the display optic support at a second pivot, such that the display optic support is movable with respect to the frame; and
      a display optic movably coupled to the display optic support.

10. The near-eye display system of claim 9, wherein the display optic comprises one or more of a display and a redirective element.

11. The near-eye display system of claim 9, wherein the first arm and the second arm are each coupled to a same side of the display optic support.

12. The near-eye display system of claim 9, wherein the first arm and the second arm are coupled to different sides of the display optic support.

13. The near-eye display system of claim 9, wherein the display optic support comprises a first support and a second support, and wherein the display optic is movably mounted between the first support and the second support.

14. The near-eye display system of claim 9, further comprising an electronically controlled movement mechanism configured to move the movable near-eye display between an extended position and a retracted position.

15. A near-eye display system, comprising:
   a frame configured to be supported by a head of a user;
   a movable near-eye display comprising
      a display optic support coupled with the frame via a first arm and a second arm, the first arm being pivotally coupled to the frame and to the display optic support at a first pivot, and the second arm being pivotally coupled to the frame and to the display optic support at a second pivot, such that the display optic support is movable with respect to the frame, and
      a display optic coupled to the display optic support; and
   an electronically controlled movement mechanism operatively coupled to the movable near-eye display to move the near-eye display between an extended position and a retracted position.

16. The near-eye display system of claim 15, wherein the display optic comprises one or more of a display and a redirective element.

17. The near-eye display system of claim 15, wherein the first arm and the second arm are each coupled to a same side of the display optic support.

18. The near-eye display system of claim 15, wherein the first arm and the second arm are coupled to different sides of the display optic support.

19. The near-eye display system of claim 15, wherein the display optic support comprises a first support and a second support, and wherein the display optic is mounted between the first support and the second support.

20. The near-eye display system of claim 15, further comprising an electronically controlled movement mechanism configured to move the movable near-eye display between an extended position and a retracted position.

* * * * *